United States Patent

[11] 3,607,856

[72] Inventor Edwin F. Peters
Lansing, Ill.
[21] Appl. No. 637,083
[22] Filed May 9, 1967
[45] Patented Sept. 21, 1971
[73] Assignee Standard Oil Company
Chicago, Ill.

[54] OXIDIZED MANGANESE CATALYST AND POLYMERIZATION PROCESS OF ETHYLENE
2 Claims, No Drawings

[52] U.S. Cl..................................................... 260/94.9,
260/84.1, 260/93.7, 260/94.1, 260/94.3, 252/430
[51] Int. Cl...................................................... C08d 3/04,
C08d 3/06, C08d 3/10
[50] Field of Search........................................... 252/430;
260/94.9 D

[56] References Cited
UNITED STATES PATENTS

| | | | |
|---|---|---|---|
| 2,824,089 | 2/1958 | Peters et al. .................. | 260/94.9 D X |
| 2,944,049 | 2/1960 | Edmonds....................... | 260/94.9 D |
| 2,963,447 | 12/1960 | Peters et al. .................. | 252/430 |
| 3,158,594 | 11/1964 | Weil et al....................... | 260/94.9 D |
| 3,166,537 | 1/1965 | Gregg et al. .................. | 260/94.9 D X |

Primary Examiner—Joseph L. Schofer
Assistant Examiner—William F. Hamrock
Attorneys—Pike H. Sullivan, Arthur G. Gilkes and Ralph C. Medhurst ABSTRACT: A novel catalyst composite for the polymerization of unsaturated organic compounds is oxidized manganese extended on a support used in conjunction with an organoaluminum compound.

OXIDIZED MANGANESE CATALYST AND POLYMERIZATION PROCESS OF ETHYLENE

My invention relates to a novel catalyst and a novel process using such catalyst for the polymerization of unsaturated organic compounds. Specifically, my invention relates to polymerization catalysts which comprises oxidized manganese on an inert support in conjunction with an aluminum hydrocarbon compound. Such catalysts are particularly useful for polymerizing ethylenically unsaturated hydrocarbons and acetylenic hydrocarbons and mixtures thereof.

Numerous catalysts are known for the polymerization of unsaturated organic compounds. Among these are transition metal oxides of Groups 4, 5 and 6 of the Periodic Table. These oxides are generally active only when carried or extended upon inert support materials, such as difficulty reducible metal oxides. Many other transition metal compounds have been disclosed as possessing catalytic activity when used in the form of salts and in conjunction with organoaluminum compounds and other promoters. I have now found that oxidized manganese, which is catalytically inactive by itself, when extended upon an inert support and used in conjunction with an organoaluminum promoter has catalytic activity for the polymerization of unsaturated organic compounds.

The catalytic activity of oxidized manganese is realized only when the oxide is extended on an inert or difficultly reducible support.

By difficultly reducible support I means supports which are relatively unreactive with a reducing component or components of the polymerization reaction system. These supports are such compounds as the difficultly reducible metal oxides, for example, alumina, magnesia, titania, boria, zirconia, silica or other composites, such as synthetic alumino silicates, and the like, and physical mixtures thereof.

Various methods may be used to place the oxidized manganese on the support, the method being chosen so as to achieve relatively uniform distribution of the oxidized manganese over the support. Various methods for impregnating supports with catalytic oxides are known to the art. One of the simplest suitable for my invention is impregnation of the support with a solution of a manganese compound followed by calcination in air. Suitable catalysts have been made by impregnating a support with such compounds as potassium permanganate, calcium manganate, manganese acetate tetrahydrate and the like, followed by calcination. A finely divided oxide of manganese can also be distributed over a support by physical admixture. If the catalyst composition is prepared with some manganese compound not an oxide it is necessary that the impregnated support be calcined in an oxidizing atmosphere in order to convert the manganese compound to oxidized manganese oxide prior to use. The calcination in any case can be useful as a means for removing from the catalyst composition substances which have a deleterious effect upon a polymerization reaction. Calcination can generally be effectively carried out in air or other oxidizing atmospheres at a temperature in the range from about 200° C. to about 600° C. for from about 15 minutes to about 24 hours.

The relative proportion of support to manganese oxide is not a critical feature of my invention and therefore may be varied through a wide range such that each component is present in at least a catalytically effective amount, preferably at least about 0.1 percent by weight. The usual manganese oxide: support ratios are in the range of about 1:100 to 1:1.

The organoaluminum compounds suitable as promoters in my novel catalyst composition are those conforming to the general formula:

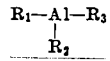

$$R_1-Al-R_3$$
$$|$$
$$R_2$$

wherein $R_1$, $R_2$ and $R_3$ may be the same or different monovalent radicals selected from the class consisting of hydrogen and monovalent hydrocarbon radicals. Examples of suitable R groups include an aryl radical, aliphatic hydrocarbon radical or derivative, such as alkyl, cycloalkyl-alkyl, cycloalkenyl-alkyl, aryl-alkyl, cycloakyl and the like. Specific examples of R groups for substitution in the above formula include methyl, ethyl, propyl, isopropyl, isobutyl, amyl, isoamyl and the like, well known to this art.

The proportion of organoaluminum cocatalysts to be used with the supported manganese oxide can range from about 0.001 to 20 weight percent or more based on the weight of the polymerizable feed material. It is usually employed in proportions between about 0.01 and about 10 weight percent.

The weight ratio of supported manganese oxide to monomer can generally be varied in the range of about 0.01 to about 10 percent by weight though greater amounts are also effective.

Polymerization can be effected with my novel catalyst at temperatures which vary in accordance with the polymerization activity of the specific monomer or comonomer and promoters. Desirable polymerization temperatures generally fall within the range of about −80° C. to about 400° C., and often 0° C. to about 350° C., and are preferably within the range of about 25° C. to about 300° C.

Polymerization can be carried out in the gas phase or in liquefied monomer but it is often desirable to effect polymerization in the presence of a substantially inert reaction medium which functions as a partial solvent for the monomer, and which may also function as a solvent for the organoaluminum cocatalyst as well as being a liquid transport medium to remove solid polymerization product as a dispersion if continuous reaction is effected.

Particularly suitable liquid reaction media are various classes of hydrocarbons or their mixtures which are liquid and substantially inert under the polymerization conditions of my process. Certain classes of aliphatic hydrocarbons can be employed as reaction media, such as the various saturated alkanes and cycloalkanes. Specifically, I may use such liquid or liquefied alkanes as propanes, butanes, n-pentane, n-hexane, decalin and the like.

The feed for polymerization in accordance with my invention can be any polymerizable ethylenic or acetylenic organic compound, particularly l-alkenes and l-alkynes. My process is particularly applicable to the terminal l-olefins, diolefins having a terminal unsaturation and terminal acetylenes. Suitable terminal l-olefins have the general formula $RCH=CH_2$ wherein R is hydrogen or a saturated monovalent hydrocarbon radical, for example, alkyl, cycloalkyl, aryl, alkyl-aryl and the like. Specific suitable feed stocks are such compounds as ethylene, propylene, l-butene, l-pentene, butadiene, isoprene, acetylene, propyne, l-butyne and the like.

It should be understood that mixtures of the specific monomers can be polymerized and that the various monomers are not equivalents for the purpose of my invention. Quite different polymer products can be obtained by varying the feed stocks.

The polymerization carried out with my catalyst is preferably effected in the absence of impurities which tend to act as catalyst poisons, as by reacting with and consuming the catalyst or components of the catalytic mixture, such impurities being generally known to the art and including oxygen, carbon dioxide, water and the like.

In order to provide the worker in this art with a better understanding of the nature of my novel polymerization catalysts and the practice of my novel processes, the following examples are offered.

A catalyst was prepared by impregnating a silica support (Davison Grade 70) with a solution of calcium manganate. The catalyst was dried and then calcined in oxygen over a period of 75 minutes, beginning at a temperature of 25° C. and reaching 500° C. At the end of the calcination, the catalyst composition contained 4.7 percent by weight oxides of manganese calculated as manganese dioxide. The precise oxidation state is not known.

Into a reaction bomb there was charged 2.0 g. of the supported oxidized manganese catalyst, 200 ml. of n-heptane, 0.20 g. aluminum triisobutyl and 104 g. ethylene. The bomb was warmed from 25° C. to 77° C. and held for 8 hours under 1175 p.s.i.g. ethylene pressure. At the end of this time there was recovered from the reaction mixture 16.5 g. of solid polyethylene.

A silica support (Cab-O-Sil Grade M-5) was impregnated with manganese acetate, dried, and calcined in oxygen for 60 minutes over the temperature range 25° C. to 500° C. At the end of this treatment the composition contained 3.9 percent by weight oxides of manganese calculated as manganese dioxide.

Into a reaction bomb there was charged 1.1 g. of such catalyst, 200 ml. n-heptane, 0.20 g. aluminum triisobutyl, and 92 g. ethylene. This reaction mixture was held at about room temperature for 20 hours under 750 p.s.i.g. ethylene. There was recovered from the reaction mixture 4.6 g. of solid polyethylene.

The importance of adequate calcination so as to attain a high oxidation state of manganese is shown by the following example.

A silica support (Davison Grade 70) was impregnated with potassium permanganate and calcined for 35 minutes in oxygen over a temperature range of 25°to 200° C. After treatment the catalyst composition contained 4.9 percent by weight manganese oxides calculated as manganese dioxide.

Into a reaction bomb there was charged 1.0 g. of such oxidized manganese catalyst, 250 ml. n-heptane, 0.44 g. aluminum triisobutyl and 55 g. ethylene. The mixture was warmed from 25°to 88° C. and held for 2 hours under ethylene pressure of 850 p.s.i.g. There was obtained from the reaction mixture 0.9 g. of solid polyethylene, a lower yield than in the preceding example, wherein more severe calcination conditions were employed.

In similar fashion oxidized manganese catalysts of my invention prepared from other manganese compounds on other inert supports and promoted with other organoaluminum compounds can be used for the practice of my novel polymerization process.

Having thus described my invention, what I claim is:

1. A process for the polymerization of ethylene in the presence of a catalyst which catalyst comprises in combination calcined oxidized manganese extended upon an inert support selected from the group consisting of alumina, magnesia, titania, boria, zirconia, silica and composites and mixtures thereof and aluminum triisobutyl, said oxidized manganese and said support being present in a ratio within the range of about 1:100 to 1:1 by weight and said calcined oxidized manganese extended upon an inert support and said aluminum triisobutyl, each being present in an amount within the range of about 0.01 to 10 percent by weight based upon the amount of ethylene monomer 2. The composition of claim 1 wherein said inert support is silica and said organoaluminum compound is aluminum triisobutyl.